United States Patent
Schumacher et al.

(10) Patent No.: US 7,523,332 B2
(45) Date of Patent: Apr. 21, 2009

(54) INTERFACE MODULE WITH ON-BOARD POWER-CONSUMPTION MONITORING

(75) Inventors: Derek Steven Schumacher, Auburn, CA (US); Idis Ramona Martinez, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/118,654

(22) Filed: Apr. 29, 2005

(65) Prior Publication Data

US 2006/0248366 A1    Nov. 2, 2006

(51) Int. Cl.
G06F 1/00 (2006.01)
G06F 1/26 (2006.01)
G06F 1/32 (2006.01)

(52) U.S. Cl. .................. 713/323; 713/300; 713/320

(58) Field of Classification Search ............. 713/323, 713/300, 320
See application file for complete search history.

(56) References Cited

U.S. PATENT DOCUMENTS

| | | | |
|---|---|---|---|
| 4,667,289 A * | 5/1987 | Yoshida et al. ............. 713/340 |
| 6,389,544 B1 * | 5/2002 | Katagiri .................... 713/300 |
| 6,577,500 B2 * | 6/2003 | Paredes et al. ............. 361/686 |
| 7,254,075 B2 * | 8/2007 | Woo et al. .................. 365/207 |
| 7,404,071 B2 * | 7/2008 | Janzen et al. ................. 713/1 |
| 2003/0056126 A1 * | 3/2003 | O'Connor et al. .......... 713/300 |
| 2004/0034749 A1 | 2/2004 | Jeddeloh |
| 2004/0225801 A1 | 11/2004 | Scordalakes et al. |
| 2004/0225802 A1 | 11/2004 | Krishnamurthy et al. |
| 2004/0260853 A1 | 12/2004 | Cho |
| 2005/0102539 A1 * | 5/2005 | Hepner et al. ............... 713/300 |
| 2005/0283635 A1 * | 12/2005 | Benson et al. ................ 714/1 |

* cited by examiner

*Primary Examiner*—Thomas Lee
*Assistant Examiner*—Michael J Brown

(57) ABSTRACT

An interface module for interfacing an external device with a host computer is physically and electrically connected to the host computer. The module monitors its own power consumption and reports its power consumption to the host computer. This information can be used to determine the total power consumed by multiple modules, to indicate a problem with the interface module, or to detect a leakage current associated with the external device when main power is off.

11 Claims, 2 Drawing Sheets

INTERFACE MODULE WITH ON-BOARD POWER-CONSUMPTION MONITORING

BACKGROUND OF THE INVENTION

The present invention relates to computers and, more particularly, to interface modules for computers. In this specification, related art labeled "prior art" is admitted prior art; related art not labeled "prior art" is not admitted prior art.

Computers are often built using interface modules, such as external disk interfaces that are inserted into peripheral connect interface (PCI) slots and PCI express slots. The modular nature makes it easy to repair and upgrade systems by swapping interface modules.

SUMMARY OF THE INVENTION

The present invention as defined in the claims provides for tracking power consumption by interface modules. For example, an interface module within a computer system (such as a server) can actively monitor its own power consumption. The interface module can then report or maintain power-consumption data that may be accessed as needed by the computer system itself. "Module" herein refers to a device, such as a PCI card, a PMCIA Card, or a USB flash card adapter, that can be inserted and removed from a computer. "Interface module" refers to such modules that provide for communication between a computer and an external device.

The invention allows accurate monitoring of conditions that could otherwise lead to failure and provides a source of diagnostic data in the event of system failure related to excessive power consumption. Modules that self-monitor power consumption can provide highly accurate data to the user and/or the system, which has significant advantages over error-prone theoretical measurements or estimations. In addition, certain embodiments of the invention provide for monitoring leakage currents, thereby providing for more reliable "hot-swapping" of interface modules. These and other features and advantages of the invention are apparent from the description below with reference to the following drawings.

DETAILED DESCRIPTION

Figure 1:
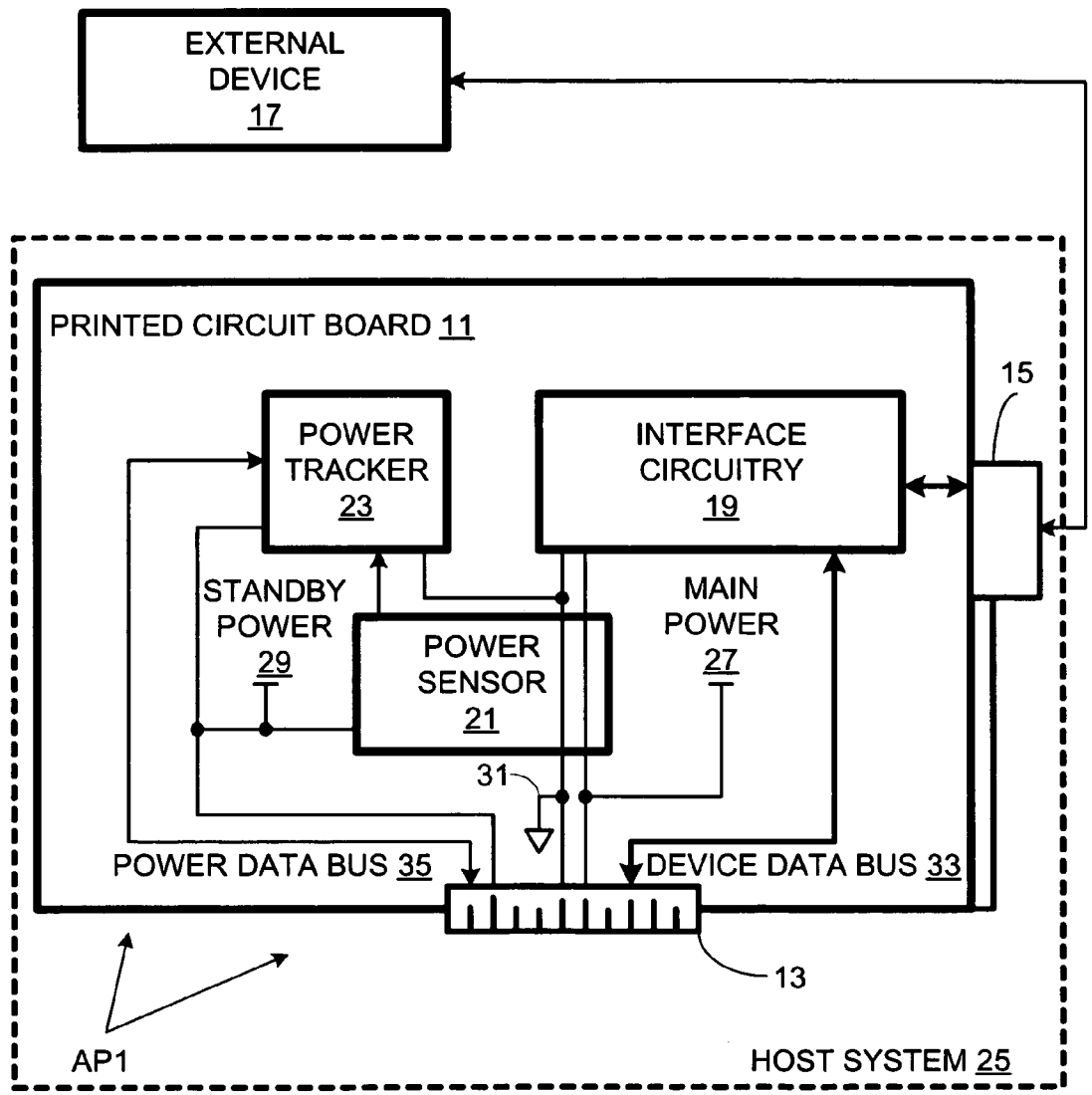
FIG. 1 is a schematic diagram of one of many interface modules within the scope of the invention.
Figure 2:
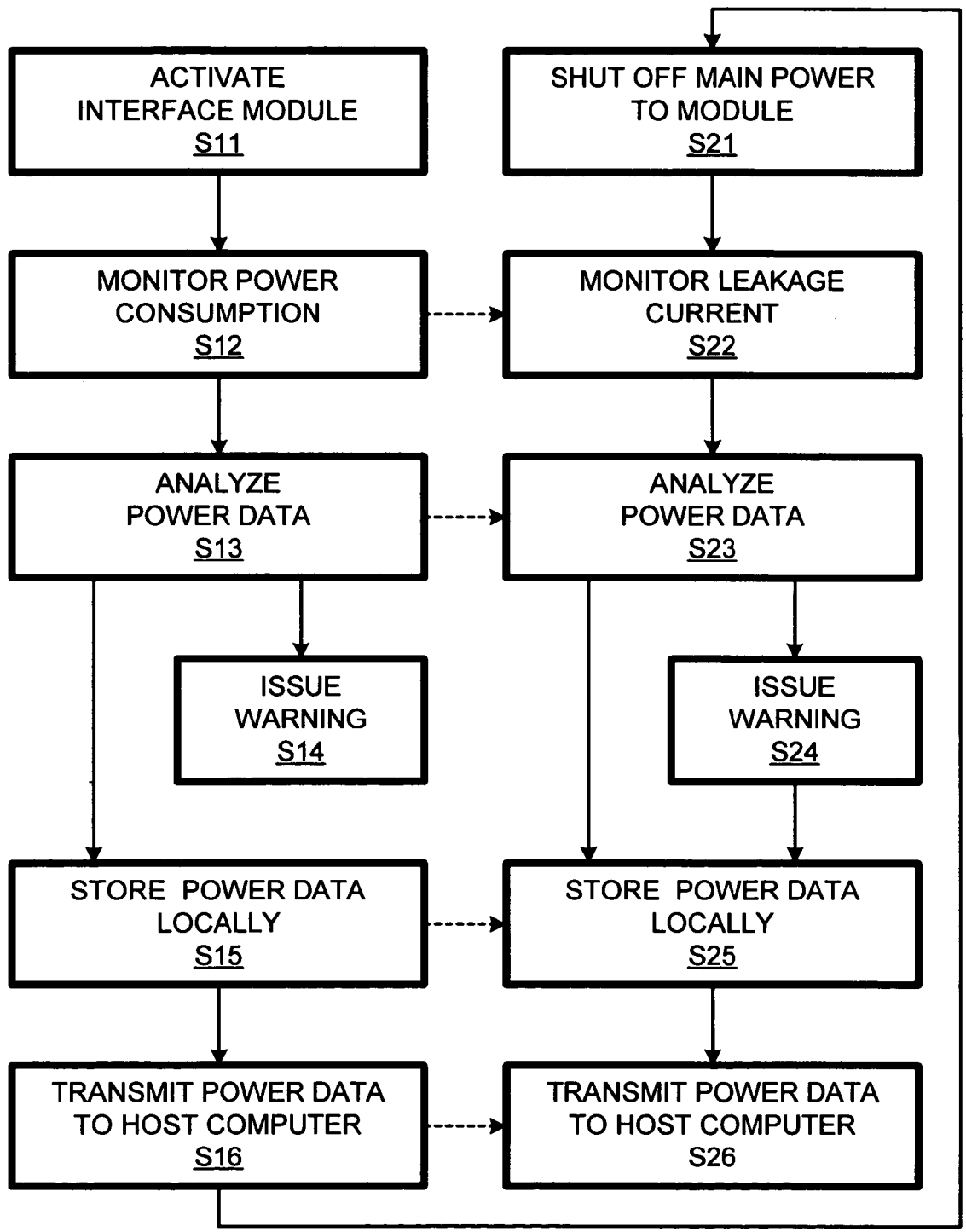
FIG. 2 is a flow chart of one of many methods within the scope of the invention.

Of the many possible interface modules provided by the invention, FIG. 1 schematically represents an interface module AP1 comprising a printed circuit board 11, a plug 13, a connector 15 for an external device 17, interface circuitry 19, a power sensor 21, and a power tracker 23. Plug 13 provides for physical and electrical connection with an incorporating host computer system 25, e.g., via a socket fixed to motherboard thereof. Host computer system 25 can be a server, but the invention applies as well to other types of computers with modular interface devices.

The electrical connections include power, ground, and signal lines, e.g., address, data, and control lines. Both main power 27 and a standby power 29 are supplied, as is ground 31. More generally, several power lines at different voltage levels can be provided. A device data bus 33 provides various signal lines for interfacing with external device 17. In addition, a power data bus 35 provides for communication between power tracker 23 and host system 25.

A method M1 of the invention can be practiced in the context of interface module AP1, as well as in alternative modular interfaces. At process segment S11, interface module AP1 is activated. Activation of module AP1 can be the result of a power-on of host system 25, or the supply of main power 27 to interface module AP1, e.g., after a hot swap.

During process segment S12, power sensor 21 tracks power usage, e.g., by monitoring electrical parameters associated with main power 27 and ground 31. Optionally, standby power 29 can be monitored. More generally, multiple power and ground sources can be monitored using sensor 21. Sensor 21 converts analog sensor readings to digital form for transmission to power tracker 23.

At process segment S13, power tracker 23 analyzes and manipulates digital sensor data generated at process segment S12. For example, the data can be time-stamped and associated with other data, such as operating modes. If the data indicates a problematic condition, power tracker 23 can issue a warning along power data bus 35 to host computer system 25 at process step S14.

At process segment S15, the modified power data can be stored in on-board non-volatile memory for future access by software running on host system 25. To avoid overflowing the non-volatile memory, host computer software can read the contents at a process segment S16 and, if appropriate, store it in more capacious memory, e.g., a hard disk. Alternatively, the modified power data can be streamed to host system 25.

Occasionally, a need may arise to remove interface module AP1. For example, interface module AP1 may need to be reallocated to another server or may need to be removed to make room for a newer or better interface module. Host system 25 permits interface modules to be "hot swapped", in other words replaced without shutting down the entire system. To this end, main power 27 can be withheld from interface module AP1 at a process segment S21. Process segments S12, S13, S15 and S16 continue until host system 25 has determined (by accessing data from the power monitor) that the card has powered down correctly and that no current leakage exists from the external card that might present an unsafe condition for the user hot swapping the interface card. Once these conditions are met, standby power is also isolated from the card (effectively turning off the power monitoring capabilities of the interface card while data that has been stored in possible aforementioned storage locations remains intact) and the card may be safely removed.

Normally, all external device and interconnecting cables are removed from interface card AP1 prior to the withholding of main power 27 at method segment S21. Generally, if this is done, the power consumption associated with main power 27 should be zero once main power 27 is withheld. However, if external device 17 remains connected (e.g., due to a forgetful user), current leakage associated with a load represented by an external device 17 can result in continued power consumption. In this case, monitoring at method segment S22 (a continuation of process segment S12 beyond process segment S12) and analysis at process segment S23 (a continuation of process segment S13 beyond method segment 21) can result in a detection of a leakage current. This detection can trigger a process segment S24 in which a warning is issued. In a continuation of process segment S15, the manipulated data can be stored locally at process segment S25. In a continuation of process segment S16, the stored power data can be accessed by host computer software at step S26, which can also lead to a warning being issued.

Whether a warning is issued as a result of process segment S24 or process segment S26, removal of interface module AP1 can be contraindicated. Instead, host computer 25 can be shut down, and interface module AP1 removed or exchanged with all power off. This cold swap can prevent damage to the interface module AP1, external device 17, and/or host computer 25 when interface module AP1 is removed.

The advantages of the invention are not limited to preventing problematic hot swaps. For example, process segment 14 can be used to warn when an interface module is operating beyond specifications, e.g., drawing more power than it is designed to handle. Also, the invention can be used to assist host computer 25 in determining precisely the amount of power used by all interface modules and other devices, e.g., memory modules, installed therein. Even if each module is operating within its specification, the total may exceed that permitted by the host system. Thus, tracking total power consumption can diagnose or forewarn of problems.

While the invention is described in the context of a hot swap of an interface module for a server, it can also be applied to hot swaps of modular interfaces in different form factors and contexts. For example, it can be applied to PC Card (PMCIA Card) interfaces as well. In addition, the invention can be applied even where hot swapping is not provided for. For example, the invention can be used simply to monitor the condition of an interface module and to help determine a total power consumption for an incorporating system. These and other variations upon and modifications to the present invention are provided for by the present invention as defined by the following claims.

What is claimed is:

1. An interface module comprising:
   a host-computer connector for physically and electrically connecting to a host computer;
   an external-device connector for electrical communication with an external device;
   interface circuitry to manage communications between said host computer and said external device via said connectors;
   a power sensor for providing digital data indicating power consumed by said interface module and detects power consumption due to leakage current associated with a load associated with said external device when a main power is not provided; and
   a power tracker for time stamping said digital data to yield time-stamped data and for storing said time-stamped digital data.

2. An interface module as recited in claim 1 wherein said host-computer connector provides said main power, standby power, and ground to said interface module.

3. An interface module as recited in claim 2 wherein said power sensor provides said digital data while said standby power is provided even when said main power is not provided.

4. An interface module as recited in claim 1 wherein:
   said host-computer connector provides main power and standby power to said interface module; and
   said power sensor provides digital data to said interface circuitry indicating power consumed by said interface module, said digital data representing said main power consumed by said interface module while said main power is supplied via said host-computer connector, and representing leakage current associated with said external device when said standby power but not said main power is provided to said interface module.

5. A method comprising:
   generating digital data representing power consumption by an interface module for interfacing an external device with a host computer;
   wherein said digital data represents power consumption associated with leakage associated with said external device while a main power is off;
   time-stamping said digital data to yield time-stamped data; and
   transferring said time-stamped data to said host computer.

6. A method as recited in claim 5 wherein said power consumption includes power associated with said main power, said generating occurring even when said main power is off.

7. A method as recited in claim 5 further comprising storing said time-stamped data before transferring it to said host computer.

8. A method as recited in claim 5 comprising:
   generating digital data representing power consumption by an interface module for interfacing an external device with a host computer via a host-computer connector of said interface module, said digital data representing consumption of power from a main power source while said main power source is coupled to said interface module via said host-computer connector, said digital data representing leakage current associated with an external device coupled to said interface module via an external-device connector of said interface module while said main power source is uncoupled from said interface module and a standby source is coupled to said interface module; and
   transferring said digital data to said host computer.

9. A method comprising:
   supplying main power to an interface module of a computer;
   monitoring power consumption by said interface module after said main power is withheld from said interface module to determine whether or not a leakage current is present;
   in the event said leakage current is not detected, performing a hot swap of said interface module; and
   in the event said leakage current is detected, performing a cold swap of said interface module.

10. A method as recited in claim 9 wherein said monitoring step involves using a power sensor located on said interface module.

11. A method as recited in claim 10 wherein said power sensor is powered by standby power while said main power is withheld.

* * * * *